United States Patent
Jonsson et al.

[11] Patent Number: 5,903,833
[45] Date of Patent: May 11, 1999

[54] METHOD AND APPARATUS FOR ROUTING CALLS BY REMOTE CONTROL

[75] Inventors: Björn Jonsson, Järfälla; Arne Norefors, Stockholm, both of Sweden

[73] Assignee: Telefonaktiebolaget L M Ericsson, Stockholm, Sweden

[21] Appl. No.: 08/705,851

[22] Filed: Aug. 30, 1996

[51] Int. Cl.⁶ .................................................. H04M 3/42
[52] U.S. Cl. ........................ 455/417; 455/435; 455/445
[58] Field of Search .................................... 455/414, 415, 455/416, 417, 461, 445, 31.2, 432, 435, 459, 420; 379/199, 200, 201, 212

[56] References Cited

U.S. PATENT DOCUMENTS

| | | | |
|---|---|---|---|
| 4,275,385 | 6/1981 | White | 340/312 |
| 4,748,655 | 5/1988 | Thrower et al. | 379/60 |
| 4,878,243 | 10/1989 | Hashimoto | 379/211 |
| 4,980,907 | 12/1990 | Raith et al. | 379/63 |
| 5,202,912 | 4/1993 | Breeden et al. | 379/57 |
| 5,222,123 | 6/1993 | Brown et al. | 379/57 |
| 5,243,645 | 9/1993 | Bissell et al. | 379/211 |
| 5,315,636 | 5/1994 | Patel | 379/58 |
| 5,363,425 | 11/1994 | Mufti et al. | 379/38 |
| 5,463,674 | 10/1995 | Gillig et al. | 455/417 |
| 5,479,408 | 12/1995 | Will | 370/94.1 |

FOREIGN PATENT DOCUMENTS

| | | |
|---|---|---|
| 0 724 351 A2 | 7/1996 | European Pat. Off. . |
| WO 91/07838 | 5/1991 | WIPO . |
| WO 93/16549 | 8/1993 | WIPO . |
| WO 95/33326 | 12/1995 | WIPO . |
| WO 96/09714 | 3/1996 | WIPO . |

*Primary Examiner*—Wellington Chin
*Assistant Examiner*—Lee Nguyen
*Attorney, Agent, or Firm*—Jenkens & Gilchrist, P.C.

[57] ABSTRACT

A mobile telephone is used to control the routing of an incoming or outgoing call in a mobile communications network. A number of registration devices having low energy transmitters are strategically located throughout the coverage area of the mobile communications network. Each registration device is associated with a number of nearby fixed telephones. As the mobile terminal enters the coverage area of a registration device, the mobile telephone receives a registration signal from the registration device. At the onset of a call, the mobile terminal displays a list of the fixed telephones to a user. The user inputs a preference to the mobile terminal to receive or make the incoming or outgoing call via one of the nearby fixed telephones or the mobile terminal. The mobile terminal transmits the preference to a service node, which sets up and appropriately routes the call. The mobile terminal thus remotely controls the routing of the incoming or outgoing call.

55 Claims, 8 Drawing Sheets

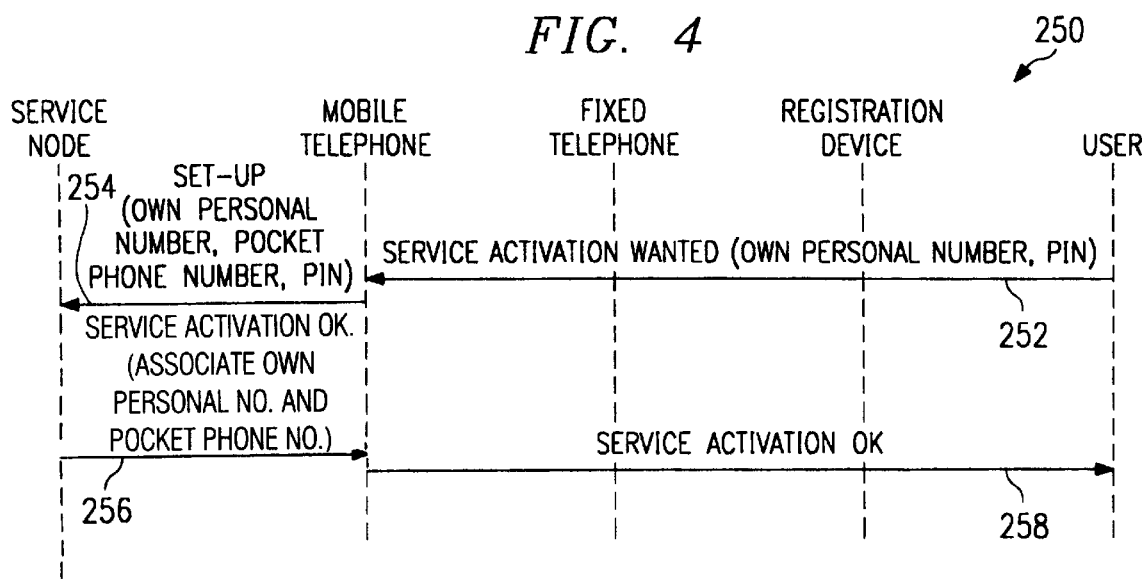
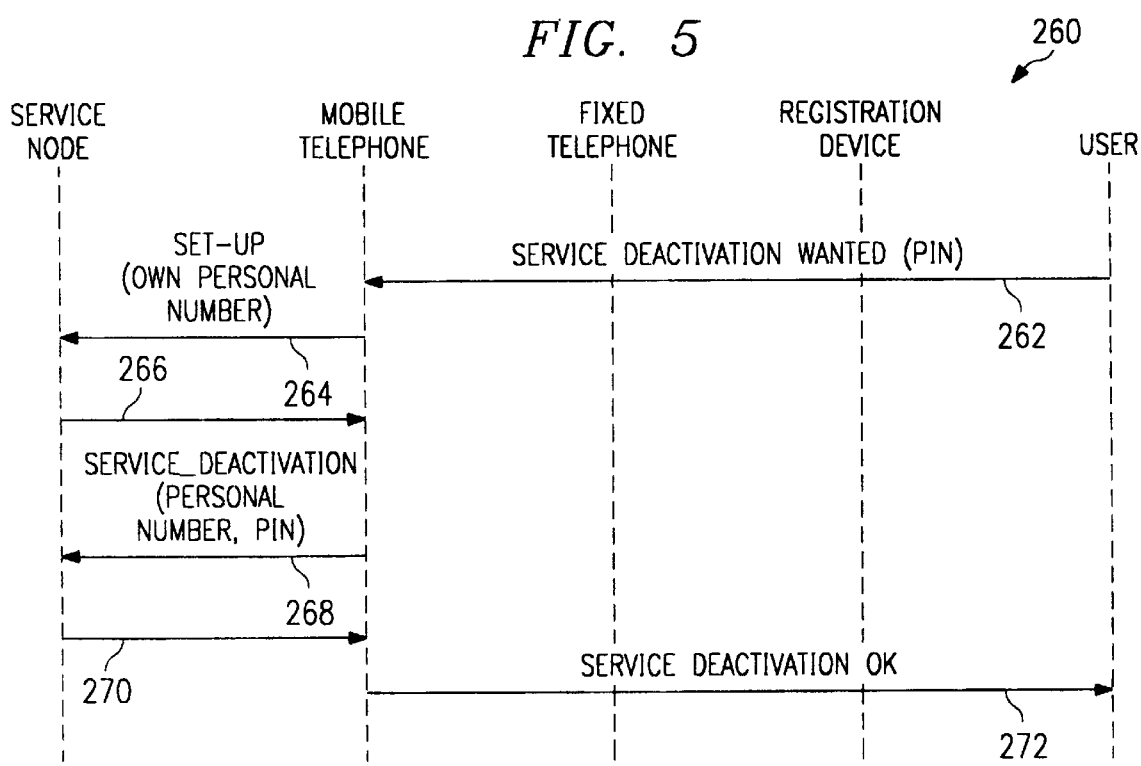

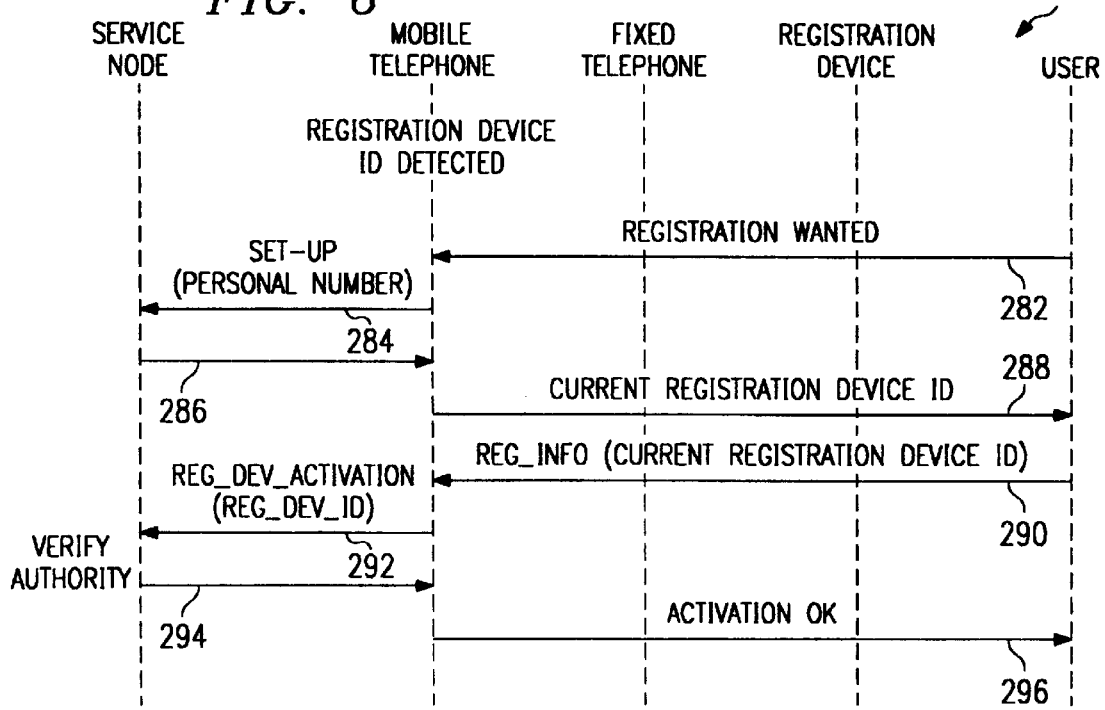
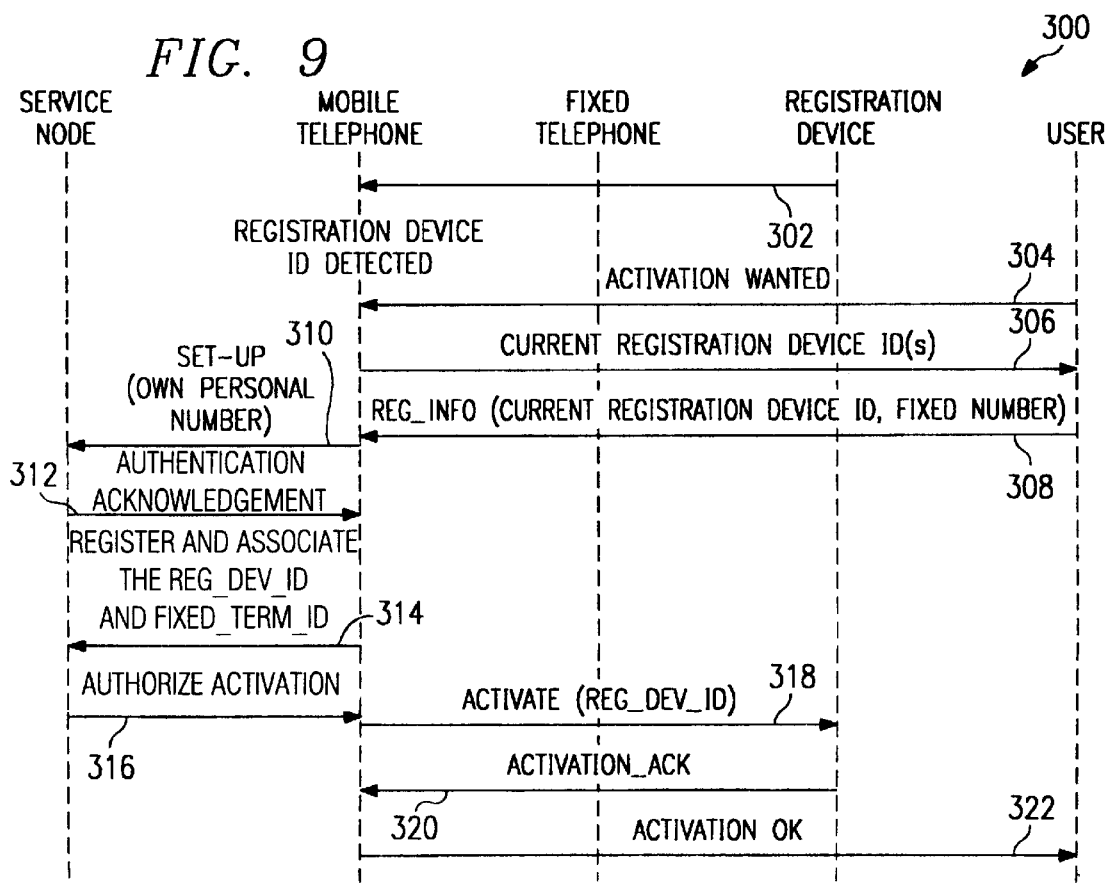

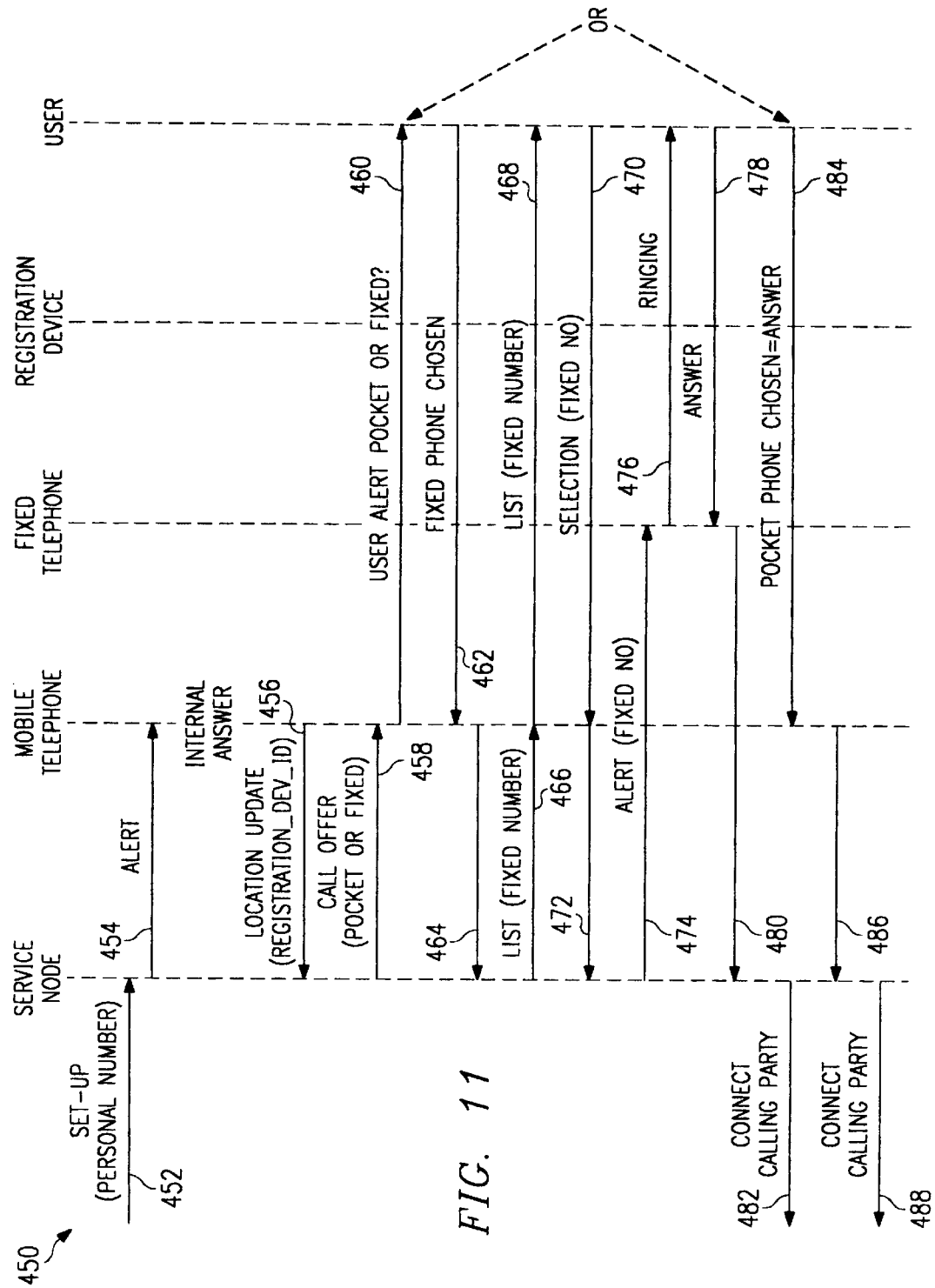

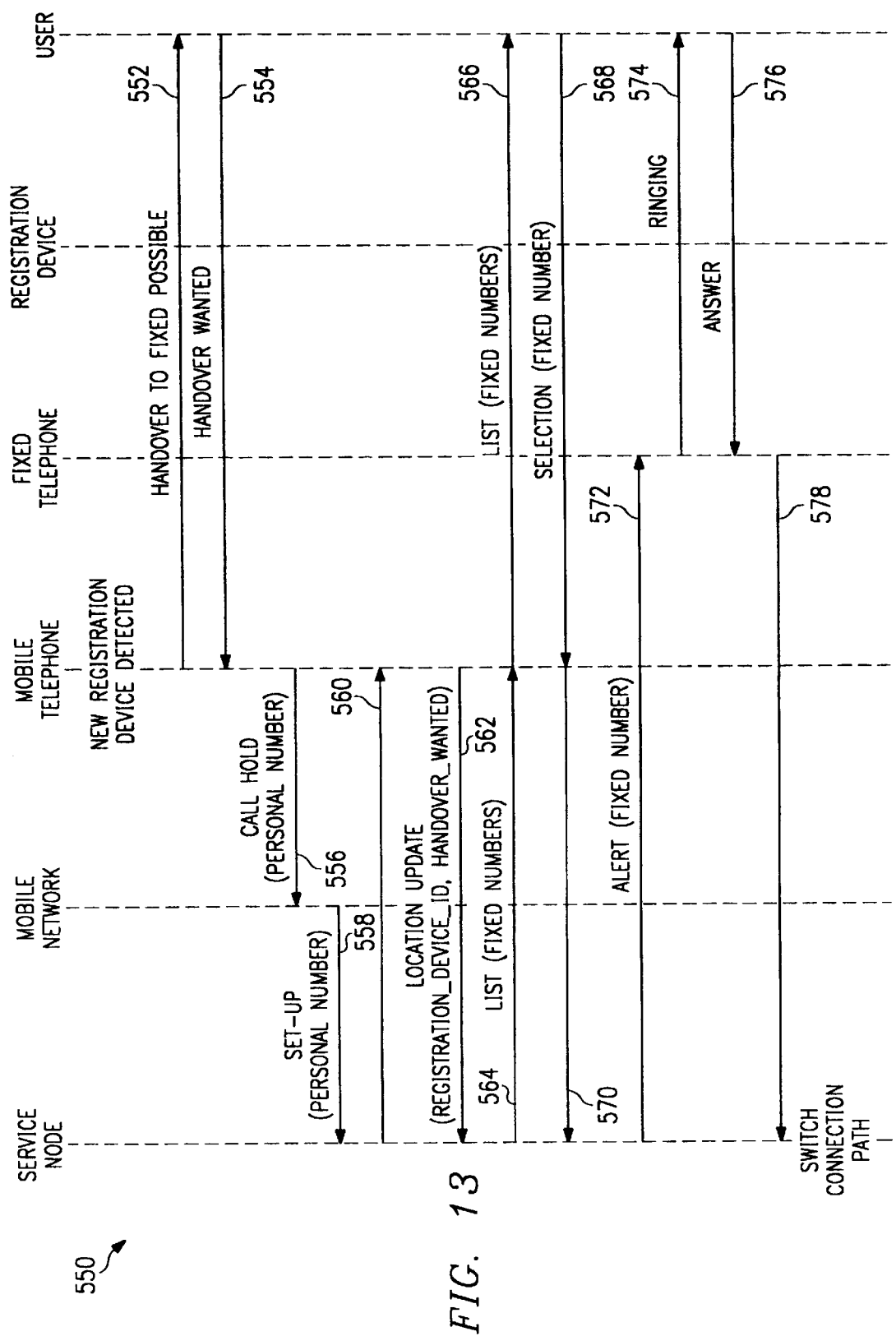

METHOD AND APPARATUS FOR ROUTING CALLS BY REMOTE CONTROL

BACKGROUND OF THE INVENTION

1. Technical Field of the Invention

The present invention relates generally to the telecommunications field and, in particular, to a method and apparatus for routing calls in a mobile communications network to a fixed telephone or mobile terminal by remote control.

2. Description of Related Art

Wireless and fixed telecommunications networks are rapidly becoming the primary means of communicating throughout the world. However, there are a number of disadvantages associated with the co-existence of these two technologies. For example, it has become increasingly common for users to subscribe for services from different mobile and fixed telephone networks. Consequently, because of dissimilarities in the operations of these networks and their user interfaces, it has become inconvenient for the user who desires to access these services in a consistent and cost-effective manner.

Additionally, many businesses now realize that their communications costs have multiplied since the advent of the mobile phone. For example, many employees prefer to make mobile phone calls, which are relatively expensive in comparison with fixed network calls. In fact, it has become a common practice for employees to make their office telephone number their "personal" number, by diverting incoming calls from their office phones to their mobile phones. Although this increased employee mobility has its obvious advantages, the associated costs are substantial. As a result, many companies have severely restricted their employees' business use of mobile telephones.

Most conventional fixed and mobile telephone networks provide a call forwarding capability, which allows a user to route incoming calls to an alternate phone or terminal. For example, an article entitled: "A Distributed Location System For The Active Office" published in the IEEE Network, January/February 1994 Volume, discloses a method and apparatus for providing localized communications services to individuals with mobile phones. An infrared transmitter in the form of a badge is attached to each individual and to mobile computer equipment in a work facility (e.g., building). A plurality of infrared sensors (receivers) are interconnected by a wired network and strategically placed at fixed locations throughout the facility. The system of transmitters and sensors define a user interface that can be dynamically mapped to the surrounding computer and communications resources. Therefore, an incoming call can be routed directly to the telephone nearest a specific individual or computer.

U.S. Pat. No. 4,980,907 discloses an arrangement composed of a telepoint and mobile radio terminal. The user of the mobile terminal reports the identity of the telepoint to a location storage device (memory) in a fixed telephone network. The fixed network forwards incoming calls to the mobile terminal via the telepoint.

U.S. Pat. No. 5,202,912 discloses a method whereby a calling party's mobile terminal is registered with a telepoint. When the calling party initiates a call, a paging message is transmitted that contains the address of the telepoint to which the calling party has registered. The paging message is received by the called party's terminal. The called party's terminal is registered with a second telepoint. The address of the calling party's telepoint is downloaded to the called party's telepoint, the two telepoints are connected, and the call is routed to the called party.

Call forwarding is provided as an optional service by existing mobile and fixed networks. However, once the service is initiated, the user typically turns it "on" or "off". Consequently, all (or just a preselected type) of the incoming calls are forwarded while the service is tuned "on", and no calls are forwarded when the service is turned "off". In other words, the user in a mobile communications network does not have the option of screening and forwarding individual incoming calls.

Known solutions to routing problems are primarily concerned with techniques of routing incoming calls to a user. These solutions can increase the mobility of a user. However, with regard to outgoing calls, a user will not experience a similar increase in mobility. In order to avoid using costly mobile connections in certain situations, a user may have to borrow someone else's fixed telephone. The owner of the fixed telephone may be reluctant to let someone else use the phone, and especially for costly long distance calls.

SUMMARY OF THE INVENTION

It is an object of the present invention to provide increased mobility for communications network users along with decreased communications costs.

It is another object of the present invention to provide a mobile communications network with a mobile terminal that can be used by any person as a personal remote control device to route incoming and outgoing calls.

It is another object of the present invention to provide a mobile communications terminal that can be used to screen incoming calls and route selected calls to a fixed telephone.

It is yet another object of the present invention to allow a user increased flexibility to select, by remote control, a fixed telephone to make an outgoing call, whereby the charge for the call would be incurred by the user.

In accordance with one aspect of the present invention, the foregoing and other objects are achieved by a method and system by which a user can remotely control the routing of incoming calls from any communications network by using a mobile terminal.

In accordance with yet another aspect of the present invention, the foregoing and other objects are achieved by providing a service node and a personal number for rerouting incoming calls to the service node.

In accordance with another aspect of the present invention, a service node is provided that establishes a dialogue with a called user for routing incoming calls from any other communications network, a registration device associated with at least one fixed telephone, and a mobile terminal that allows the user to screen and remotely control the routing of individual calls to that fixed telephone.

In accordance with yet another aspect of the present invention, a call that has been received in a mobile communications network is handed over and continued on a telephone in a fixed network.

BRIEF DESCRIPTION OF THE DRAWINGS

A more complete understanding of the method and apparatus of the present invention may be had by reference to the following detailed description when taken in conjunction with the accompanying drawings wherein:

FIG. 4 is a sequence diagram that can be used to implement a method of activating a remotely controlled call routing service, in accordance with a preferred embodiment of the present invention;

FIG. 5 is a sequence diagram that can be used to implement a method of deactivating a remotely controlled call routing service, in accordance with a preferred embodiment of the present invention;

FIG. 6 is a sequence diagram that can be used to implement a method of activating a registration device for use in a remotely controlled call routing system, in accordance with a preferred embodiment of the present invention;

FIG. 9 is a sequence diagram that can be used to implement a method of is activating a registration device for use in a remotely controlled call routing system, in accordance with the third embodiment of the present invention;

FIG. 11 is a sequence diagram that can be used to implement a method of routing an incoming call in a remotely controlled call routing system, in accordance with a preferred embodiment of the present invention;

FIG. 13 is a sequence diagram that can be used to implement a method of handing over an ongoing call to a fixed telephone in a remotely controlled call routing system, in accordance with a preferred embodiment of the present invention.

DETAILED DESCRIPTION OF THE DRAWINGS

The preferred embodiment of the present invention and its advantages are best understood by referring to FIGS. 1–14 of the drawings, like numerals being used for like and corresponding parts of the various drawings.

Figure 1:
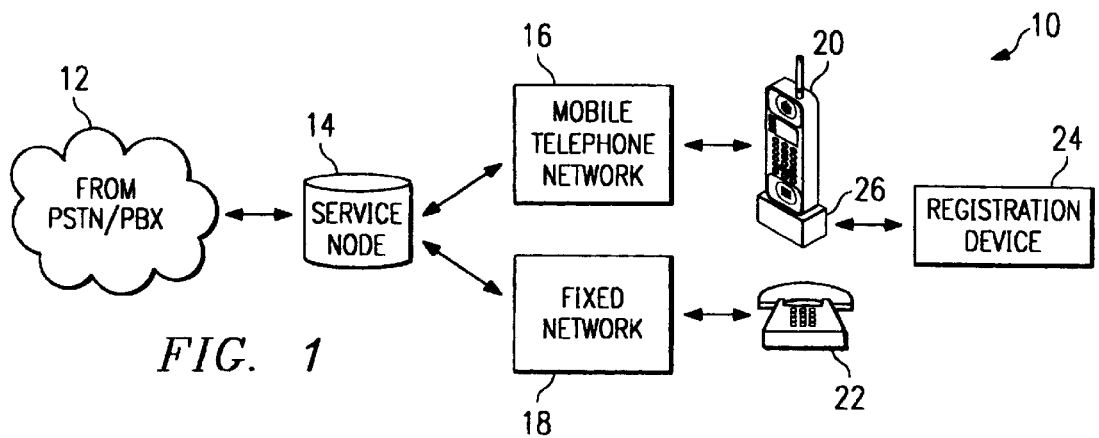
FIG. 1 is a top level schematic block diagram that illustrates a method and apparatus for call routing by remote control, in accordance with a preferred embodiment of the present invention.

FIG. 1 is a top level schematic block diagram that illustrates a method and system that can be used for routing calls by remote control, in accordance with a preferred embodiment of the present invention. Generally, in this illustrative example, the system 10 includes a service node 14, which is connected for two-way communications with a telecommunications network, such as, for example, a Public Switched Telephone Network (PSTN), a Private Branch Exchange (PSTN/PBX 12), telephony over Internet, a mobile telephone network 16, and a fixed network 18. A fixed telephone terminal 22 is connected by wired access to fixed network 18. For clarity, but not meant to limit the scope of the invention, the term "fixed network" shall mean generally hereinafter a telecommunications network with wired access, and "mobile network" shall mean generally a telecommunications network with radio access. For example, a fixed network can include a PSTN or PBX network, and a mobile network can include the Global System for Mobile communications (GSM), the Nordic Mobile Telephone (NMT) system, the Personal Digital Cellular (PDC) system, the North American Advanced and Digital Advanced Mobile Phone Systems (AMPS and D-AMPS), and the Personal Communications System (PCS). Service node 14 is preferably a network independent control computer, which can be integrated with a node in, for example, a PSTN, a PBX, a Mobile Services Switching Center, or an Intelligent Network.

A mobile telephone terminal 20 is connected for two-way communications to mobile network 16 via an air interface. A service control module 26 is connected for the transfer of control signals, voice and data to mobile terminal 20. A registration device 24 is connected via an air interface to service control module 26. In addition to communicating with registration device 24 and mobile terminal 20, service control module 26 presents a user interface display for mobile terminal 20. Service control module 26 can be integrated with mobile terminal 20, in which case the display is the terminal's ordinary display. Alternatively, service control module 26 can be a separate unit connected to mobile terminal 20 by a cable and a standard interface.

Registration device 24 includes a readable memory device that contains a unique identifier of that specific registration device. Notably, although a single registration device is shown and described in this illustrative example, the scope of the invention includes a plurality of registration devices whereby each device has its own identifier. Registration device 24 operates in an active state or passive state. The operating state of registration device 24 is set by a command signal from service control module 26. The command signal is initiated by a user of mobile telephone 20. Preferably, a user enters a personal identification number (PIN) code to mobile telephone 20 in order to change the operating state of registration device 24. Registration device 24 can use any of a plurality of technologies for exchanging information with service control module 26, such as, for example, infrared light, low power radio energy, or "reflexion" of received energy including modification of signal contents.

Figure 2:
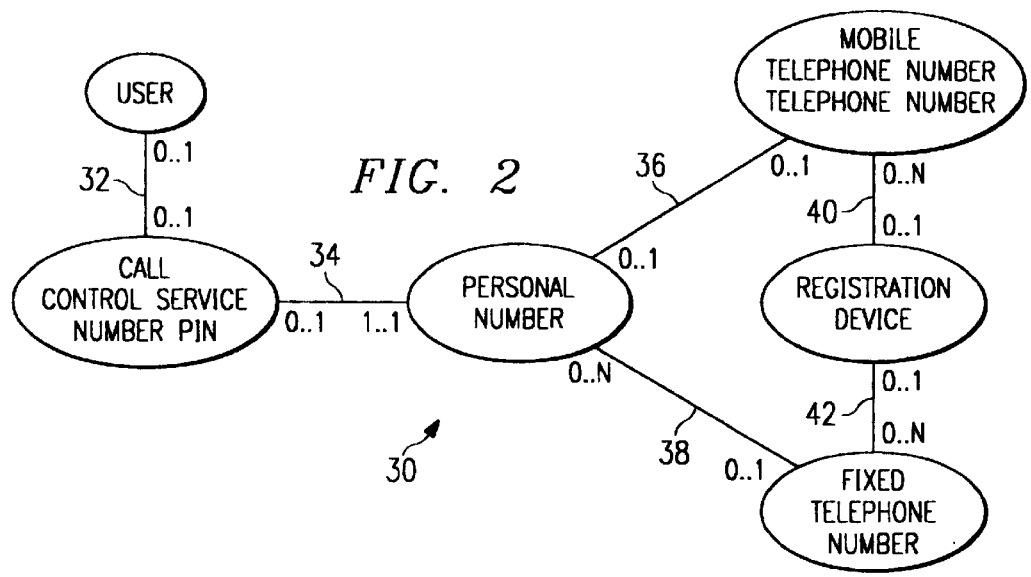
FIG. 2 is a top level block diagram that illustrates certain functional relationships between components shown in FIG. 1 and a subscriber or user of services provided, in accordance with the preferred embodiment of the present invention.

FIG. 2 is a top level block diagram that illustrates certain functional relationships between components shown in FIG. 1, in accordance with the preferred embodiment of the present invention. At line 32, a service provider (e.g., administrator of PBX network 12) defines the services to be provided to a subscribing user, and (at line 34) assigns a personal telephone number to that user. For increased security, the service provider can also assign that user an authenticating PIN code. Using the subscriber's personal number, an incoming call is routed to service node 14, which establishes a dialogue with the subscriber in order to determine the routing of the incoming call to a fixed terminal or a mobile telephone available to that subscriber.

For example, in the preferred embodiment, service node 14 generates a list of fixed telephones that are available to the user for the purpose of receiving and carrying on incoming (terminating) calls. These fixed telephones are associated with a registration device (e.g., registration device 24) that has established a registration link with service control module 26 of mobile telephone 20. In other words, the mobile telephone is located within the coverage area of a registration device, and the service control module connected to that mobile telephone can establish a registration link with that registration device via the air interface. Using the display interface at the mobile telephone, the user thereby has the option of selecting from the list of fixed telephones (less costly alternative) or simply using the mobile telephone to take the incoming call.

At line 36 in FIG. 2, when the call routing service is activated by the user of mobile telephone 20, the user (by typing in appropriate commands) customizes the service to recognize the personal telephone number as that phone's number for incoming or mobile terminating calls. It should be understood that any mobile terminal can be used to create the association between the personal telephone number and a mobile phone's number.

At line 38, a relationship between the personal telephone number associated with mobile telephone 20 and any fixed telephone number listed by service node 14 is automatically established or updated by the service node. In the preferred embodiment, this relationship is established during the call setup process. At line 40, mobile telephone 20 establishes a relationship with registration device 24, when the mobile telephone receives identification information from the registration device. At line 42, the user of mobile telephone 20 selectively customizes the service (e.g., using the display interface) to select a fixed telephone number associated with the registration device.

Notably, in another embodiment of the present invention, if the user has already established an ongoing call using the mobile telephone, and the mobile telephone then enters the coverage area of a registration device (e.g., registration device 24) and establishes a registration link with that device, system 10 automatically provides an indication to the user (e.g., via the mobile display interface) that the ongoing mobile telephone conversation can be handed over to a fixed telephone associated with that registration device. A list of available fixed telephone numbers (and, if necessary, their location) is displayed for the user's selection at the mobile phone. Consequently, the user can employ the mobile telephone to remotely control the routing of calls to a selected fixed telephone or to the mobile telephone itself.

It is useful at this point to describe a number of important functions performed by service node 14 of remote call routing system 10. For example, in order to route an incoming call to a user, the service node substitutes a user's personal telephone number for a number of a selected fixed telephone or for the user's mobile telephone number, and initiates a call to that number.

In addition to substituting telephone numbers, the service node (14) has an interface to at least one telecommunications network and further exchanges control signals with the mobile telephone. Moreover, the service node stores the identity of one or more registration devices and the telephone numbers of fixed telephones associated with each of those devices.

The service node (14) also performs some administrative functions within system 10, such as, for example, authenticating the identity of service node users, and controlling switching functions associated with the routing of calls, supervisory functions, mobile telephone and user interactions, communications with registration devices, terminal/service node signaling, security functions related to the telephone service (e.g., message encryption/decryption, etc.), and providing system usage statistics.

Figure 3:
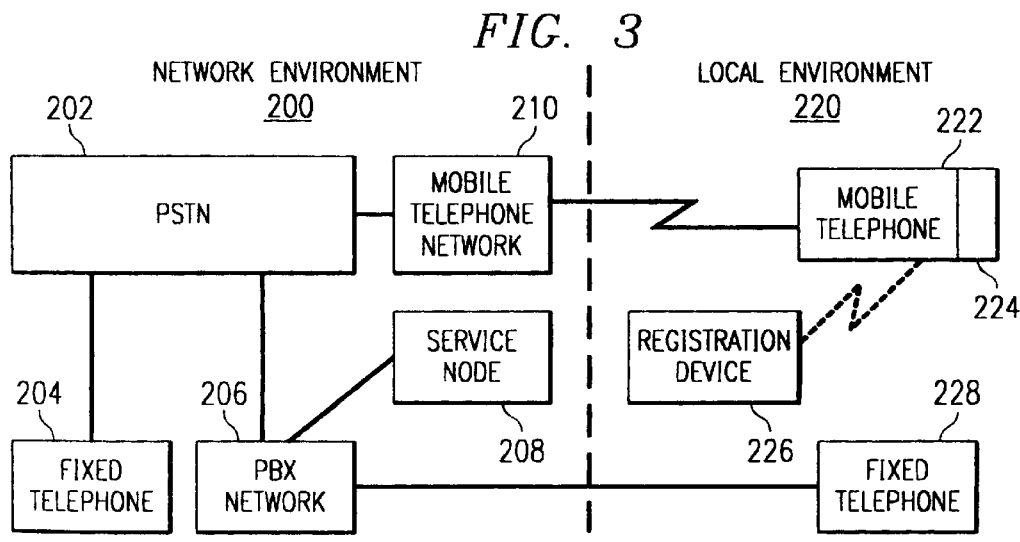
FIG. 3 is a top level block diagram that can be used to implement a method and apparatus for call routing by remote control, in accordance with a second embodiment of the present invention.

FIG. 3 is a top level block diagram that can be used to implement a method and apparatus for routing calls by remote control, in accordance with a second embodiment of the present invention. For illustrative purposes, the call routing system shown in FIG. 3 is similar to the call routing system (10) shown in FIG. 1. The system in FIG. 3 is logically separated into two operational environments or segments. A network segment 200 includes a PSTN 202 in which 204 denotes a fixed telephone, a PBX network 206, and a mobile telephone network 210. A service node 208 is connected for two-way communications to PBX network 206. Essentially, the PSTN, PBX, fixed telephone and mobile telephone networks in the network segment are arranged and function substantially similar to the like components shown in FIG. 1.

The local or user segment 220 of the call routing system shown in FIG. 3 includes a mobile telephone 222 connected to service control module 224. Mobile telephone 222 is connected by an air interface to mobile telephone network 210 in network segment 200. In this embodiment, service control module 224 includes an energy receptor (not explicitly shown) for receiving control signals from a registration device 226. This energy receptor can be, for example, a low power radio receiver or an infrared light sensor. Registration device 226 includes an energy transmitter (not explicitly shown) for transmitting control signals, including a registration device identity code, a relatively short distance to service control module 224. This energy transmitter can be, for example, a low power radio transmitter or an infrared light transmitting device. The registration device identity code can be associated with a specific registration device (e.g., registration device 226) by basing it on a serial number of that registration device. A fixed telephone 228, which is one of a plurality of fixed telephones associated with registration device 226, is connected for two-way communications to PBX network 206 in network segment 200. Essentially, the mobile telephone, service control module, registration device, and fixed telephone in the local segment are arranged and function substantially similar to the like components shown in FIG. 1.

In this embodiment, in addition to the functions described above with respect to FIGS. 1 and 2, service control module 224 provides the following primary functions: controls signaling with service node 208; provides a user interface with mobile telephone 222; receives and detects control information transmitted by registration device 226; and, in response to receiving a stable signal from registration device 226, switches to a ready state in preparation for communications with service node 208. Signaling between service control module 224 and service node 208 is accomplished by coupling the signals through mobile telephone 222, mobile telephone network 210, PSTN 202, and PBX network 206.

In operation, when mobile telephone 222 moves within the relatively small coverage area of registration device 226, the registration device's identity code is transferred by a low energy or infrared device to service control module 224. During the call setup process for a mobile terminating call, mobile telephone 222 transfers the identity code of at least one registration device 226 over the air interface to mobile telephone network 210. The identity code is then transferred through the PSTN and PBX network to service node 208. Service node 208 generates a list of fixed telephones and transfers the list back to service control module 224. Service control module provides the list of fixed telephones for display to the user on the mobile telephone. The user can select from the list of fixed telephones or the mobile telephone to receive an incoming call. Service control module 224 transfers the user's selection information (if any) via the mobile telephone, mobile network, PSTN and PBX to service node 208. Service node 208 substitutes the telephone number of the selected telephone (e.g., fixed telephone 228) for the mobile telephone number, and initiates termination of the call towards that number, by, for example, transferring that number along with appropriate control signals to the PBX network, which causes the PBX network to connect the incoming call to fixed telephone 228. If the user elects to take the call on the mobile telephone, the service node forwards the mobile telephone number and appropriate control signals to the PSTN via the PBX network to route the incoming call to the mobile phone. Consequently, the user employs the mobile telephone to remotely control the routing of incoming calls, in order to take advantage of either the lower rates for the fixed telephone or the mobility of the mobile phone. Additionally, it should be understood that instead of a user selecting from a list of fixed telephone numbers generated by the service node, the user can manually type in (using the keys on the mobile phone) the preferred number of a fixed telephone, which can avoid the need for a registration device.

FIG. 4 is a sequence diagram that can be used to implement a method 250 of activating a remotely controlled call routing service, in accordance with a preferred embodiment of the present invention. The service activation sequence begins at step 252, whereby a user that desires to utilize a remotely controlled routing service, inputs a command that requests the desired service via the mobile telephone (e.g., mobile telephone 222). The user also inputs an assigned personal telephone number, along with a PIN code for authentication purposes, if required. The mobile telephone can store the personal number in a nonvolatile memory.

At step 254, during a call setup process, the mobile telephone transfers the above-described service activation information (e.g., user's personal telephone number) along with the telephone number of the mobile phone, to the service node (e.g., service node 208) preferably via the path shown in FIG. 3. At step 256, if the service node determines that the requesting mobile telephone is authorized to activate the requested service, the service node acknowledges the service activation request and authorizes it by returning a service activation "OK" control message to the mobile telephone. This control message configures the mobile telephone to utilize the requested service. The service node also associates the user's personal telephone number with the user's mobile telephone number.

At step 258, the mobile telephone displays the service action "OK" message to the user. Essentially, the service node activates the remotely controlled call routing service in response to a service activation request from a user. The service node associates the user's mobile phone with the user's assigned personal telephone number, provides appropriate control signals to activate the service, and acknowledges the activation to the requesting user. The user's mobile phone then functions to remotely control the destination of an incoming call.

FIG. 5 is a sequence diagram that can be used to implement a method 260 of deactivating the above-described remotely controlled call routing service, in accordance with a preferred embodiment of the present invention. At step 262, the user inputs a service deactivation request command to the mobile telephone (222). If required, the user also inputs a PIN code. During a call setup process, at step 264, the mobile telephone transfers the user's personal telephone number to the service node. At step 266, the service node transfers control information back to the user's mobile phone that acknowledges receipt of the user's personal telephone number. At step 268, the mobile phone transfers a service deactivation control message to the service node, which includes the user's personal telephone number (and PIN code, if required). In response, the service node disassociates the user's personal telephone number with the mobile telephone number, and issues appropriate control signals to deactivate the remotely controlled call routing service. At step 270, the service node transfers a service deactivation control message to the mobile telephone. At step 272, the mobile telephone displays a service deactivation "OK" message to the user.

FIG. 6 is a sequence diagram that can be used to implement a method 280 of initiating the activation of a registration device for use in a remotely controlled call routing system, in accordance with a preferred embodiment of the present invention. Essentially, in the preferred embodiment, only one user may activate (or deactivate) a registration device, by causing a logical "activate" or "deactivate" state to be set in the service node. When an attempt is made to activate a registration device, it is possible that the service control module (e.g., module 224) will receive signals from more than one registration device. In that event, the service node (e.g., service node 208) can determine whether any of these registration devices have been previously registered and are still active with respect to that service node and service control module. If so, then these previously registered devices can be excluded from the present registration device activation process.

If signals are still being received from a number of such registration devices that have not been previously registered, then the service node generates a list of these registration devices, and transfers the list to the mobile phone for display to the user. The user can then select a specific registration device to be activated from the displayed list. The selection can be guided by having the device identity printed in readable form on the registration device.

Specifically, at step 282, a user inputs a command to the user's mobile phone that requests activation of a registration device. The mobile phone also stores identification information detected by the related service control module (224) from the signal received from a nearby registration device. During the call setup process, at step 284, the mobile phone transfers the user's personal telephone number in a call setup message to the service node. At step 286, if the user is an authorized user, the service node returns an acknowledgment message to the mobile phone that the personal number was received.

At step 288, the mobile phone displays a list of identities of the detected registration devices to the user. At step 290, the user inputs a command to the mobile phone that requests registration of a selected registration device. At step 292, the mobile phone transfers a registration device activation request control message to the service node. The control message contains the identification information for the registration device that has been selected for activation by the user. At step 294, if the service node determines that the registration request is authorized, the service node transfers a control message to the mobile phone that acknowledges that authorization and the request. At step 296, the mobile phone displays a registration device activation "OK" message to the user.

Figure 7:
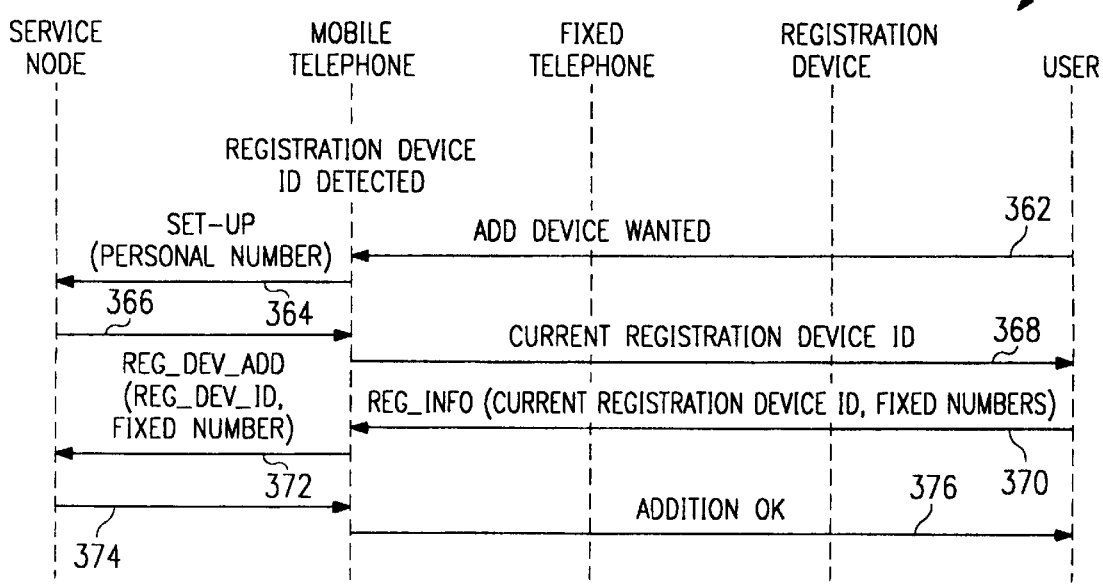
FIG. 7 is a sequence diagram that can be used to implement a method of adding a fixed telephone to the list of fixed telephones available for the user in a remotely controlled call routing system, in accordance with the second embodiment of the present invention.

FIG. 7 is a sequence diagram that can be used to implement a method 360 of adding a fixed telephone to the list of fixed telephones available for the user in a remotely controlled call routing system, in accordance with the second embodiment of the present invention. At step 362, the user inputs an "add telephone device" request to the mobile terminal. During the call setup process, at step 364, the mobile phone transfers the user's personal telephone number to the service node. At step 366, if the user's number can be authenticated, the service node returns an acknowledgment control message to the mobile telephone.

At step 368, the mobile phone displays the identification of the currently activated registration device to the user, along with a list of available fixed telephones associated with that registration device. At step 370, the user inputs registration information to the mobile phone, which includes the identification number of the current registration device, and the telephone number of a fixed telephone to be added for receiving an incoming call. At step 372, the mobile phone transfers a registration device "add" control message to the service node, which includes the identification number of the registration device, and the telephone number of the fixed telephone to be added. At step 374, if the service node determines that the request is authorized, it transfers a registration device "add" acknowledgment control message to the mobile phone. At step 376, the mobile phone displays an "addition OK" message to the user.

Figure 8:
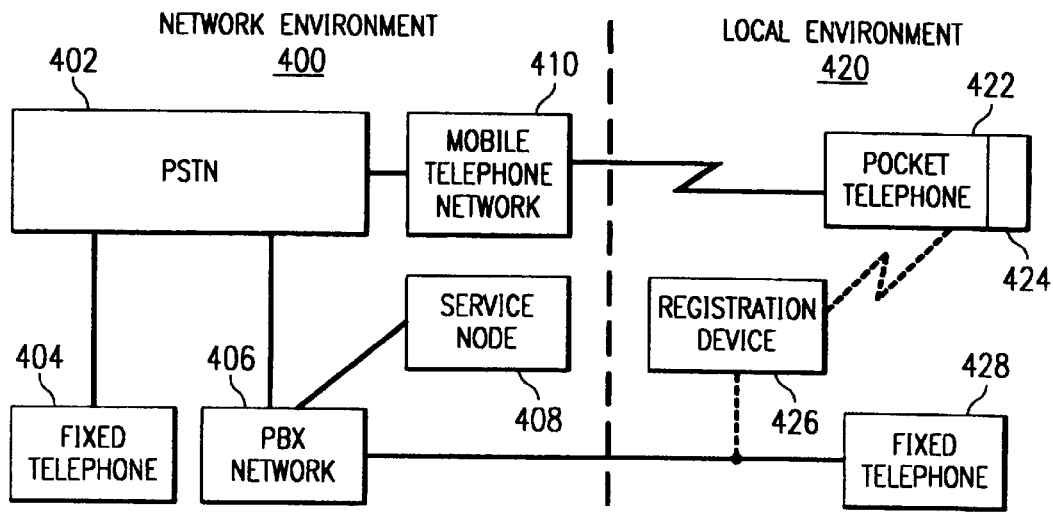
FIG. 8 is a top level block diagram that can be used to implement a method and apparatus for routing calls by remote control, in accordance with a third embodiment of the present invention.

FIG. 8 is a top level block diagram that can be used to implement a method and apparatus for routing calls by remote control, in accordance with a third embodiment of the present invention. For illustrative purposes, the call routing system shown in FIG. 8 is similar to call routing system 10 shown in FIG. 1, except that the registration device (426) shown in FIG. 8 is connected to a fixed telephone line. Consequently, the registration device can immediately detect when the associated fixed telephone has been disconnected from that line, and the registration device is automatically deactivated. The purpose for being able to detect the disconnection is to avoid the fraudulent moving of the device to another location that is not in accordance with the prevailing list of available fixed telephones. It should be understood that the described connection to a fixed telephone is only one way of allowing such a detection. For example, the registration device could also be connected to a main power supply whereby a disconnection could likewise be easily detected. In order to avoid the drawbacks of a power failure, still another method utilizes a special connector having a switch that is inaccessible for manual operation. The switch is activated when the connector is removed from its socket, and the device's disconnection can thereby be detected.

Specifically, the system is again logically separated into two operational environments or segments. A network segment 400 includes a PSTN 402 connected for two-way communications to a fixed telephone network 404, a PBX network 406, and a mobile telephone network 410. A service node 408 is connected for two-way communications to PBX network 406. Essentially, the PSTN, PBX, fixed telephone and mobile telephone networks in the network segment are arranged and function substantially similar to the like components shown in FIGS. 1 and 3.

In this embodiment, the local or user segment 420 of the call routing system shown in FIG. 8 includes a mobile phone 422 connected to a service control module 424. Mobile phone 422 is connected by an air interface to mobile telephone network 410 in network segment 400. In this embodiment, service control module 424 includes an energy receptor and an energy transmitter (not explicitly shown) for two-way exchange of control signals with a registration device 426. Registration device 426 includes an energy transmitter and an energy receiver (not explicitly shown) for exchange of control signals (including a registration device identity code and a registration device status code) a relatively short distance with service control module 424. A fixed telephone 428 is connected for two-way communications to PBX network 406 in network segment 400.

Notably, registration device 426 is connected to the communications line that connects fixed telephone 428 to PBX network 406. Essentially, except for the direct connection shown between the fixed telephone (428) and the registration device (426), the mobile phone, service control module, registration device, and fixed telephone in the local segment are arranged and function substantially similar to the like components shown in FIG. 1. It should be understood that the connection of a properly designed registration device (426) to a fixed telephone (428) can be arranged to convey speech, whereby the mobile telephone can be used as a cordless phone.

FIG. 9 is a sequence diagram that can be used to implement a method 300 of activating a registration device for use in a remotely controlled call routing system, in accordance with the third embodiment of the present invention. At step 302, a registration device (e.g., registration device 226) transmits a low power signal to a nearby service control module (224) connected to a user's mobile telephone (222). The service control module receives and detects the transmitted signal, which includes the identification number of the registration device. At step 304, the user inputs a registration device activation request to the mobile phone. In response, at step 306, the mobile phone displays the identity of the detected registration devices.

At step 308, the user inputs registration information to the mobile telephone, which includes the selected registration device's identification number. At step 310, the mobile phone transfers the user's personal telephone number in a call setup message to the service node. The service node verifies the authenticity of the call setup message and the user, and at step 312, returns an authentication acknowledgment message to the mobile phone. At step 314, the mobile phone transfers a registration device activation control message to the service node, which includes the identification number of the selected registration device and the telephone number of the selected fixed telephone.

In response, at step 316, the service node transfers a control message to the mobile phone that authorizes activation of the selected registration device. At step 318, the mobile phone transfers an activation control signal, via the service control module, to the selected registration device. The activation control signal affects a nonvolatile memory included in the registration device, to indicate an active state. At step 320, the registration device returns an activation acknowledgment control signal to the mobile phone (via the service control module). At step 322, the mobile phone displays a registration device activation "OK" message to the user. Consequently, the selected registration device is set to the "active" mode.

Figure 10:
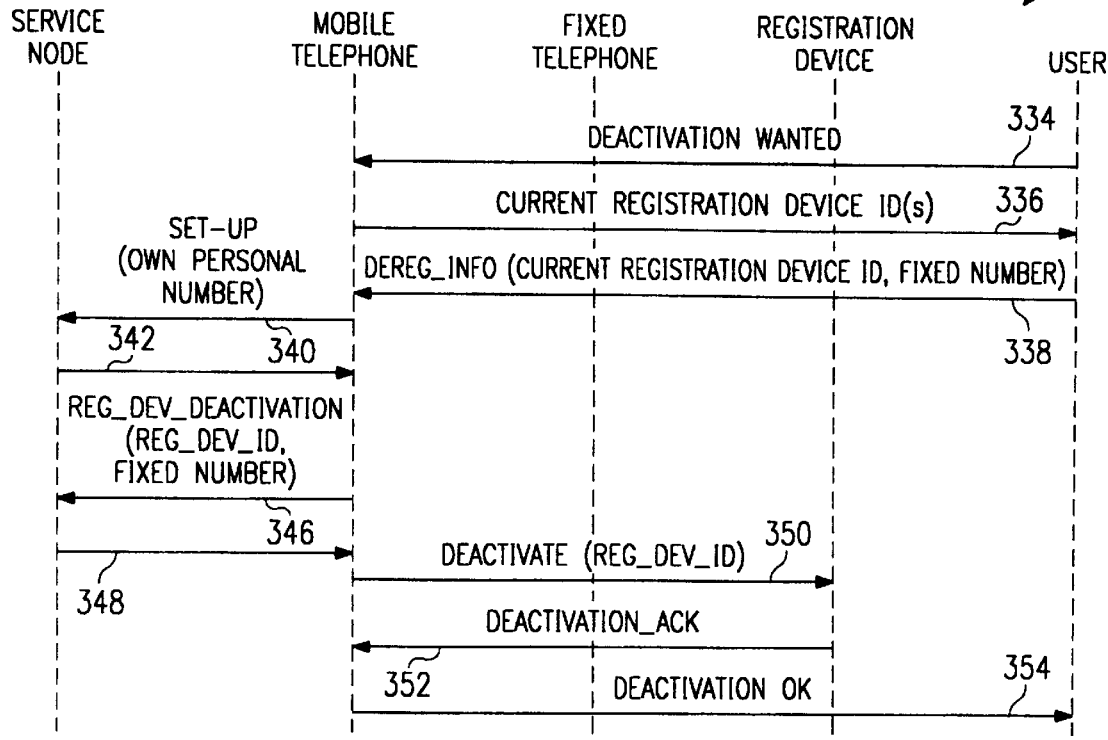
FIG. 10 is a sequence diagram that can be used to implement a method of deactivating a registration device in a remotely controlled call routing system, in accordance with the third embodiment of the present invention.

FIG. 10 is a sequence diagram that can be used to implement a method 330 of deactivating a registration device in a remotely controlled call routing system, in accordance with the third embodiment of the present invention. At step 334, the user inputs a registration device deactivation request to the mobile phone. In response, at step 336, the mobile phone displays the identity of the currently activated registration device to the user. At step 338, the user inputs deregistration information to the mobile telephone, which includes the identification number of the registration device to be deactivated. At step 340, the mobile phone transfers the user's personal telephone number in a call control message to the service node. The service node verifies the authenticity of the call control message and the user, and at step 342, returns an authentication acknowledgment message to the mobile phone. At step 346, the mobile phone transfers a registration device deactivation control message to the service node, which includes the identification number of the registration device to be deactivated.

In response, at step 348, the service node transfers a control message to the mobile phone that authorizes deactivation of the registration device. At step 350, the mobile phone transfers a deactivation control signal, via the service control module, to the registration device. At step 352, the registration device returns a deactivation acknowledgment control signal to the mobile phone (via the service control module). At step 354, the mobile phone displays a registration device deactivation "OK" message to the user. Consequently, the deactivated registration device is set to the "passive" mode. Setting the deactivated registration device to a "passive" mode avoids confusion that could occur, for example, if the registration device were moved to a new location without changing the association between it and the fixed telephones at the original location.

FIG. 11 is a sequence diagram that can be used to implement a method 450 of routing an incoming call in a remotely controlled call routing system, in accordance with a preferred embodiment of the present invention. At step 452, a setup originating with an "outside" party (e.g., a call has been made by a fixed telephone in PSTN 402 to a personal number) is routed to the service node. At step 454, the service node transfers an "alert" control message to the mobile phone that an incoming call is being setup for the user's personal telephone number. In response, at step 456, the mobile phone returns a location update control message to the service node, which includes the identification number and status of a registration device that is currently activated and registered with the mobile phone. At step 458, the service node responds by transferring a call offer control message to the mobile phone, which includes the option of receiving the call at a fixed telephone (e.g., at fixed telephone 428) or the mobile phone. At step 460, the mobile phone displays the call receiving option to the user. The user then has the option of selecting the fixed telephone or the mobile phone to receive (terminate) the call.

If the user elects to utilize a fixed telephone to receive the call, then at step 462, the user inputs that option to the mobile phone. At step 464, this selection information is transferred in a control message from the mobile phone to the service node. At step 466, the service node generates and transfers to the mobile phone a list of fixed telephone numbers associated with the activated registration device. At step 468, the mobile phone displays that list to the user.

At step 470, the user inputs to the mobile phone a selection of a fixed telephone for receiving the incoming call. At step 472, the mobile phone transfers the fixed telephone selection information in a call control message to the service node. At step 474, using the telephone number of the selected fixed telephone, the service node transfers an "incoming call" alert control message to the fixed telephone.

At step 476, the fixed telephone rings, and if (at step 478) the user answers the ring, the fixed telephone indicates in a call control message to the service node that the user has answered the phone (step 480). At step 482, the service node transfers a control message to the PBX network, which connects the calling party to the user at the fixed telephone.

Returning to step 460, if, however, the user selects the mobile phone to receive the incoming call, then at step 484, the user answers the call with the mobile phone. In that event, at step 486, the mobile phone transfers a call control message to the service node, which includes a request to connect the mobile phone to the calling party. At step 488, the service node transfers a control message to the PBX, which connects the calling party to the user at the mobile phone (via the mobile telephone network).

Figure 12:
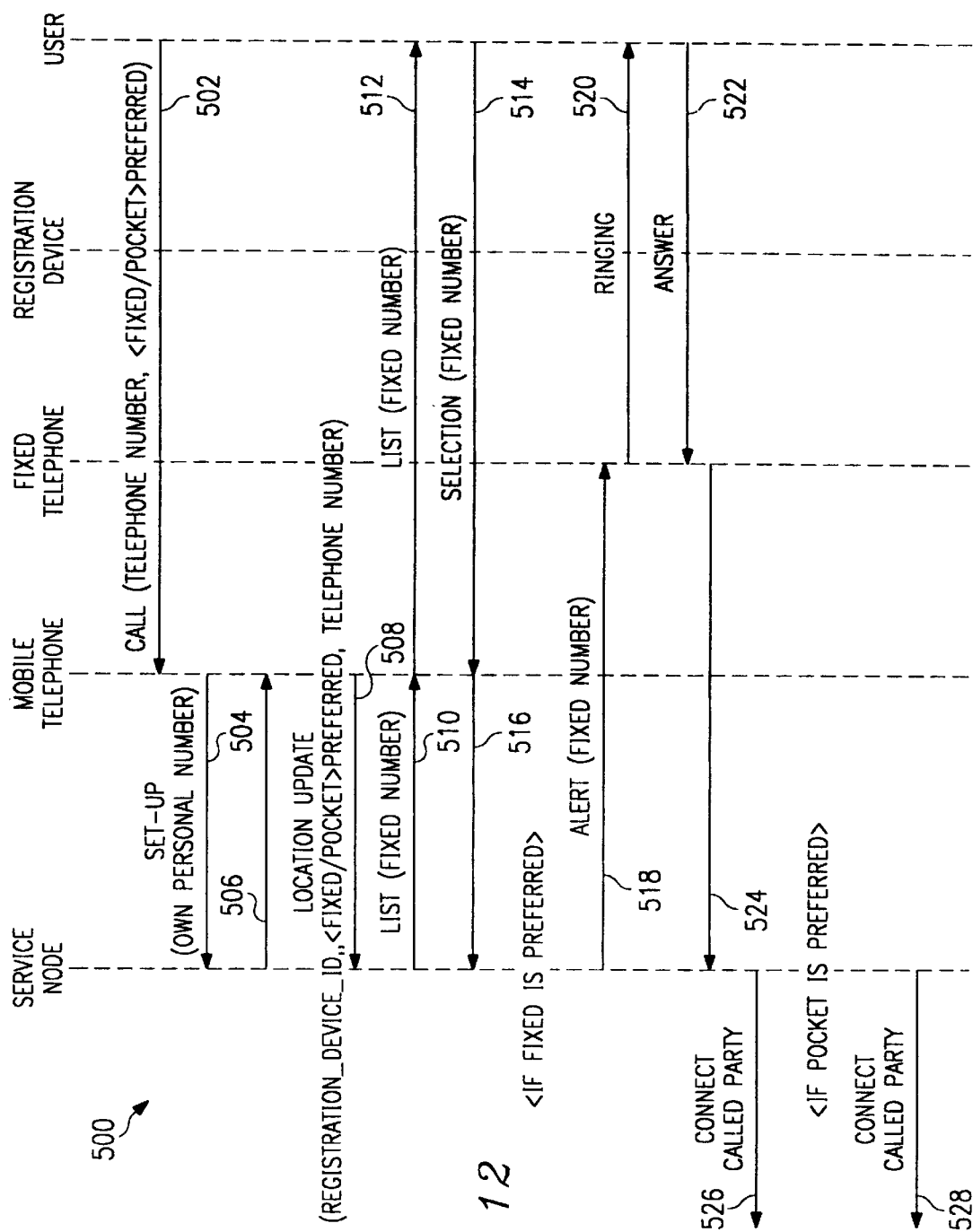
FIG. 12 is a sequence diagram that can be used to implement a method of routing an outgoing call in a remotely controlled call routing system, in accordance with a preferred embodiment of the present invention.

FIG. 12 is a sequence diagram that can be used to implement a method 500 of routing an outgoing call in a remotely controlled call routing system, in accordance with a preferred embodiment of the present invention. In this case, the user is originating the call. At step 502, the user initiates a call by inputting the telephone number of the party being called (e.g., a fixed telephone number or mobile phone number), and the user's preference as to whether a fixed phone or mobile phone will be used to make the call. At step 504, the user's mobile phone transfers a call setup message to the service node, which includes the user's personal telephone number. At step 506, upon verifying the authenticity of the user, the service node transfers a control message to the user's phone that acknowledges receipt of the call setup request. At step 508, the user's phone transfers a location update control message to the service node, which includes the identification number and status of a currently activated registration device, and the user's preference for the type of phone for the conversation.

At step 510, the service node transfers a list of fixed telephone numbers to the user's phone, which are available to make the call. At step 512, the user's phone displays the list to the user. At step 514, the user inputs to the user's own mobile phone a selection of a fixed telephone or the user's own mobile phone. At step 516, the user's phone transfers a control message to the service node, which includes the telephone number of the selected phone.

If the user has provided the telephone number of a fixed phone to the service node, then at step 518, the service node transfers a call alert message to the selected fixed telephone (via the PBX network). At step 520, the selected fixed telephone rings, and (at step 522) if the user answers the ring, the fixed telephone transfers a call connect message to the service node at step 524. At step 526, the service node transfers a call connect control message to the PBX, which connects the user's fixed telephone to the called party. Otherwise, at step 528, the service node connects the called party to the user's mobile phone.

FIG. 13 is a sequence diagram that can be used to implement a method 550 of handing over an ongoing call to a fixed telephone in a remotely controlled call routing system, in accordance with a preferred embodiment of the present invention. Prior to step 552, assume that a call has been established between the user's mobile phone and a calling party. At step 552, the user's mobile phone enters the coverage area of a registration device (e.g., registration device 426), and the signal from the registration device is detected by the mobile phone's associated service control module. The mobile phone displays a message to the user, which indicates that the call can now be handed over to a fixed telephone.

If the user desires to switch the call from the mobile phone to a fixed telephone, the user inputs a call change control command to the mobile phone, along with information that indicates the user's desire to switch or handover the ongoing call to a fixed phone. At step 556, the mobile phone transfers the call change control information (whereby the other party is put on hold) and the handover information to the mobile telephone network (e.g., mobile telephone network 410), along with the user's personal telephone number. The call change control command can be, for example, a CALL HOLD command as illustrated in FIG. 13. At step 558, the mobile network transfers a call control setup message to the service node, which includes the user's personal telephone number. If the service node can authenticate the user's personal telephone number, at step 560, it transfers a control message to the user's mobile phone, which acknowledges receipt of the handover request. At step 562, the user's mobile phone transfers a location update control message to the service node, which includes the identification number of the detected registration device and the call handover request information.

At step 564, the service node transfers a control message to the user's mobile phone, which includes a list of fixed telephone numbers associated with the detected registration device. At step 566, the mobile phone displays the list to the user. In response, the user inputs the telephone number of one of the listed fixed telephones to the mobile phone (step 568). At step 570, the mobile phone transfers the selected fixed telephone number to the service node in a control message.

At step 572, the service node establishes a connection with the fixed telephone and transfers an alert control message, which starts the ringing at step 574. At step 576, the user answers the fixed telephone, and at step 578, the fixed telephone transfers a control message to the service node, which includes a control command to switch the connection path for the ongoing call from the mobile phone to the selected fixed telephone, whereby the other party (presently on hold) is reconnected.

Figure 14:
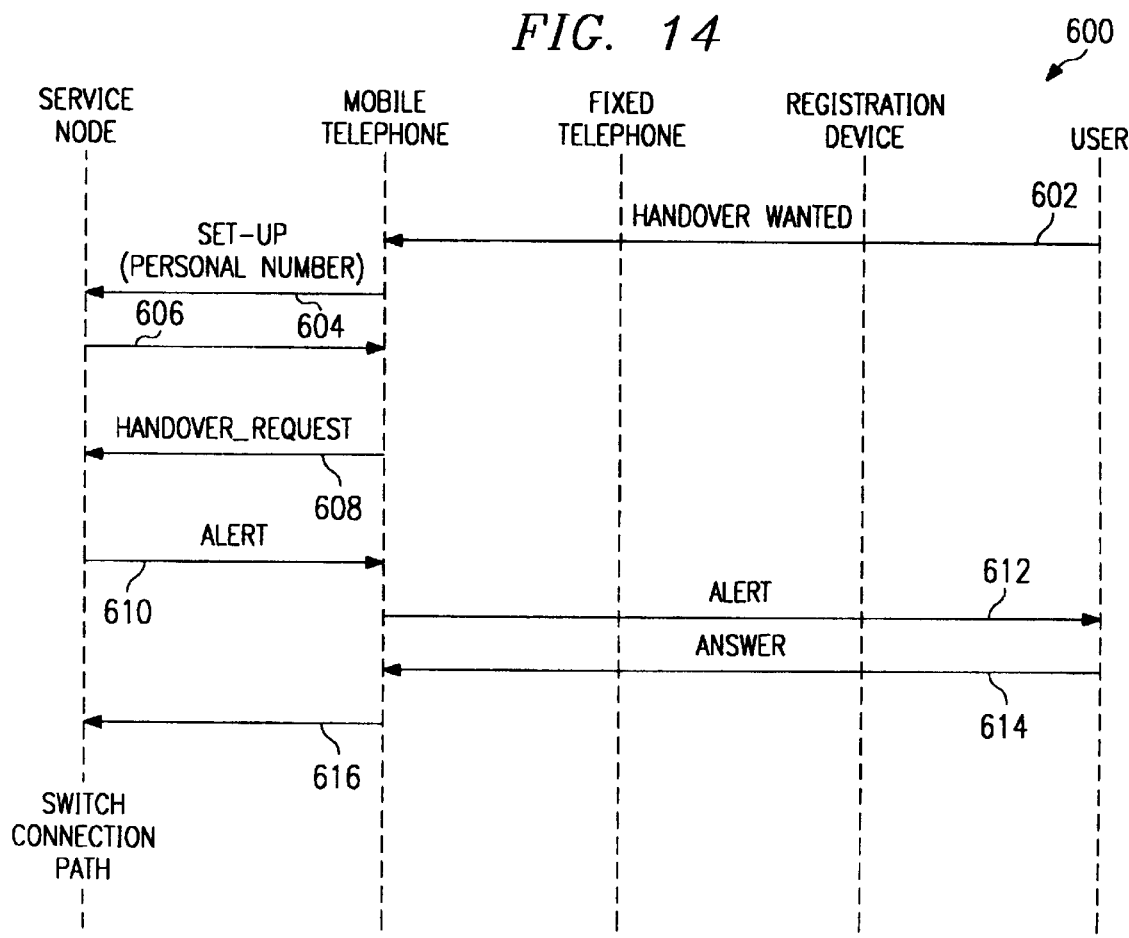
FIG. 14 is a sequence diagram that can be used to implement a method of handing over an ongoing call to a mobile phone in a remotely controlled call routing system, in accordance with a preferred embodiment of the present invention.

FIG. 14 is a sequence diagram that can be used to implement a method 600 of handing over an ongoing call to a mobile phone in a remotely controlled call routing system, in accordance with a preferred embodiment of the present invention. Prior to step 602, assume that the user has been conducting an ongoing call from a fixed telephone. At step 602, the user inputs a request to the mobile phone indicating a desire to handover the ongoing call from the fixed telephone to the mobile phone. At step 604, the mobile phone transfers a call setup control message to the service node, which includes the user's personal telephone number. The service node verifies the authenticity of the user's personal telephone number and the request, and transfers an acknowledgment control message to the mobile phone (step 606). At step 608, the mobile phone transfers a handover request control message to the service node. At step 610, the service node transfers an incoming handover call alert message to the mobile phone, which displays an indication of the incoming handover call. At step 614, the user answers the mobile phone, and at step 616, the mobile phone transfers a handover control message to the service node, which switches the connection path for the ongoing call from the fixed telephone to the mobile phone.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for remote control of routing a call in a communications network, comprising the steps of:

receiving at least a first signal at a mobile terminal in a mobile communications network, said first signal including an identifier associated with at least one fixed terminal;

receiving a second signal at said mobile terminal in said mobile communications network, said second signal alerting said mobile terminal of an incoming call;

transmitting a third signal from said mobile terminal to said mobile communications network, said third signal including said identifier associated with said at least one fixed terminal;

receiving a fourth signal at said mobile terminal in said mobile communications network, said fourth signal including said identifier associated with said at least one fixed terminal;

transmitting a fifth signal from said mobile terminal to said mobile communications network, said fifth signal including a selection of at least one of said identifier associated with said at least one fixed terminal and an identifier of said mobile terminal; and routing said call to one of said at least one fixed terminal and said mobile terminal based on said selection.

2. The method according to claim 1, wherein the routing step comprises routing said call to said at least one fixed terminal.

3. The method according to claim 1, further comprising the step of transmitting said at least first signal from a registration device associated with a plurality of fixed terminals.

4. The method according to claim 3, further comprising the steps of:

displaying at said mobile terminal a list of said plurality of fixed terminals associated with said registration device; and selecting from said display at said mobile terminal said identifier associated with said at least one fixed terminal from said plurality of fixed terminals.

5. The method according to claim 1, wherein the step of transmitting a third signal further comprises the step of transmitting said third signal in response to receiving said second signal.

6. The method according to claim 1, wherein said steps of transmitting said third signal and said fourth signal from said mobile terminal to said mobile communications network comprises transmitting said third and fifth signals to a service node accessible from said mobile communications network.

7. A method for remote control of rerouting an ongoing call in a mobile communications network, comprising the steps of:

receiving at least a first signal at a mobile terminal in said mobile communications network, said first signal including an identifier associated with at least one fixed terminal;

transmitting a second signal from said mobile terminal to said mobile communications network, said second signal including said identifier associated with said at least one fixed terminal;

receiving a third signal at said mobile terminal in said mobile communications network, said third signal including said identifier associated with said at least one fixed terminal;

transmitting a fourth signal from said mobile terminal to said mobile communications network, said fourth signal including a selection of at least one of said identifier associated with said at least one fixed terminal and an identifier of said mobile terminal;

transmitting an alert to said at least one fixed terminal, based on said selection; and in response to said alert being answered, rerouting said ongoing call to said at least one fixed terminal.

8. The method according to claim 7, further comprising the step of transmitting said first signal from a registration device associated with a plurality of fixed terminals.

9. The method according to claim 8, further comprising the steps of:

displaying at said mobile terminal a list of said plurality of fixed terminals associated with said registration device; and selecting from said display at said mobile terminal said identifier associated with said at least one fixed terminal from said plurality of fixed terminals.

10. The method according to claim 7, wherein the steps of transmitting said second and fourth signals from said mobile terminal to said mobile communications network comprises transmitting said second and fourth signals to a service node accessible from said mobile communications network.

11. A method for remote control of originating a call in a communications network, comprising the steps of:

receiving at a mobile terminal in a mobile communications network at least a first signal including an identifier associated with at least one fixed terminal in a fixed telecommunications network;

transmitting a second signal from said mobile terminal to said mobile communications network, said second signal including said identifier associated with said at least one fixed terminal;

receiving a third signal at said mobile terminal, said third signal including said identifier associated with said at least one fixed terminal;

transmitting a fourth signal from said mobile terminal to said mobile communications network, said fourth signal including a selection of at least said identifier associated with said at least one fixed terminal;

receiving an alert signal at said at least one fixed telephone in response to said selection, whereby a user replying to said alert signal can be connected to a called party.

12. The method according to claim 11, wherein the steps of transmitting said second signal and said fourth signal comprises transmitting said second signal and said fourth signal to a service node accessible from said mobile communications network.

13. The method according to claim 11, further comprising the step of transmitting said first signal from a registration device associated with a plurality of fixed telephones.

14. A method for activating by remote control a registration device for use in routing calls in at least one communications network to a fixed terminal, comprising the steps of:

receiving a first signal at a mobile terminal in a mobile communications network, said first signal including an identification of said registration device;

transmitting a second signal from said mobile terminal to a service node accessible from said mobile communications network, said second signal including said identification of said registration device and an activation request;

transmitting a third signal from said service node to said mobile terminal, said third signal including a registration device activation control signal; and transmitting a fourth signal from said mobile terminal to said registration device, said fourth signal including said registration device activation control signal said mobile terminal thereby remotely controlling said activating of said registration device.

15. The method according to claim 14, further comprising the steps of:

displaying on a display at said mobile terminal a list of a plurality of fixed terminals associated with said registration device;

selecting from said display at said mobile terminal an identifier of said fixed terminal from said plurality of fixed terminals; and transmitting said identifier of said fixed terminal from said mobile telephone to said service node.

16. A method for deactivating by remote control a registration device for use in routing calls in at least one communications network to a fixed terminal, comprising the steps of:

transmitting a first signal from a mobile terminal to a service node accessible from a mobile communications network, said first signal including an identification of said registration device and a deactivation request;

transmitting a second signal from said service node to said mobile terminal, said second signal including a registration device deactivation control signal; and transmitting a third signal from said mobile terminal to said registration device, said third signal including said registration device deactivation control signal, said mobile terminal thereby remotely controlling said deactivating of said registration device.

17. The method according to claim 16, further comprising the steps of:

displaying at said mobile terminal a list of a plurality of fixed terminals associated with said registration device;

selecting from said display at said mobile terminal an identifier of said fixed terminal from said plurality of fixed terminals; and transmitting said identifier of said fixed terminal from said mobile telephone to said service node.

18. A method for remotely controlling conditions for routing a call in a communications network, comprising the steps of:

transmitting a first signal to a service node, said service node connected to at least one telecommunications network, said first signal including a personal telephone number and a personal identification number;

transmitting a second signal to said service node, said second signal including an identity of a mobile terminal in a mobile communications network, whereby using said personal telephone number and said personal identification number, said service node creates an association between said personal telephone number and said identity of said mobile terminal; and transmitting a third signal to said service node, said third signal including an identity of a registration device and an identity of a fixed terminal in a fixed communications network, whereby said service node creates an association between said identity of said registration device and said identity of said fixed terminal.

19. The method according to claim 18, further comprising the steps of:

routing a call originated in said at least one telecommunications network to said service node, by use of said personal telephone number, said service node analyzing an origin of said call, and based on said analyzing step, establishing a dialogue with a user of said mobile terminal.

20. The method according to claim 18, wherein said third signal further includes a status code, said status code indicating one of a plurality of states associated with a status of said registration device.

21. The method according to claim 18, wherein said registration device operates in accordance with a status code, said third signal being transmitted in response to said status code including at least one of a plurality of values.

22. A method for routing a call in a mobile communications network, comprising the steps of:

transmitting a first signal from a registration device, said first signal including an identifier associated with at least one fixed terminal;

receiving said first signal at a mobile terminal in said mobile communications network;

transmitting a second signal from said mobile terminal to a mobile telephone network in said mobile communications network, said second signal including a selection of at least one of said identifier associated with said at least one fixed terminal and an identifier of said mobile terminal; and based on said selection, routing said call to one of said at least one fixed terminal and said mobile terminal.

23. The method according to claim 22, wherein said first signal comprises a low power radio signal.

24. The method according to claim 22, wherein said first signal comprises an infrared signal.

25. The method according to claim 22, wherein said step of transmitting a second signal further comprises transmitting said second signal during call setup.

26. The method according to claim 22, wherein said routing step further comprises routing said call to at least one of said fixed terminal and said mobile terminal during an ongoing call.

27. The method according to claim 22, further comprising the steps of:

detecting a routing of said call to said at least one of said fixed terminal; and terminating said call at a loss of detecting said routing.

28. The method according to claim 22, wherein said step of transmitting a second signal from said mobile terminal to a mobile telephone network in said mobile communications network comprises transmitting said second signal to a service node accessible from said mobile communications network.

29. A method for originating a call in a mobile communications network, comprising the steps of:

transmitting a first signal from a registration device, said first signal including an identifier associated with at least one fixed terminal;

receiving said first signal at a mobile terminal in said mobile communications network;

transmitting a second signal from said mobile terminal to a mobile telephone network in said mobile communications network, said second signal including said identifier associated with said at least one fixed terminal; and responsive to said second signal, routing to originate said call from said at least one fixed terminal.

30. The method according to claim 29, wherein said first signal comprises an infrared signal.

31. The method according to claim 29, wherein said step of transmitting a second signal further comprises transmitting said second signal from said mobile terminal to a service node accessible from said mobile communications network.

32. A method for use by a mobile terminal user to control routing of a call in a mobile communications network, comprising the steps of:

storing a call setup control signal in a service node, said call setup control signal including a personal number associated with said user;

transmitting a first signal from said service node to said mobile terminal, said first signal including an indication of said call setup control signal and a routing option for use by said user, said routing option including a list of a plurality of fixed terminals associated with a registration device, said registration device having established communications contact with said mobile terminal;

displaying said routing option to said user at said mobile terminal;

transmitting a second signal from said mobile terminal to said service node, said second signal including a selection from at least one of said plurality of fixed terminals and an identifier of said mobile terminal; and under control of said service node, routing a call associated with said call setup control signal to a selected one of said plurality of fixed terminals and said mobile terminal.

33. A system for use in routing a call by remote control in a mobile communications network, comprising:

registration means for identifying a plurality of associated fixed terminals, said registration means including a signal transmitter;

a mobile terminal, said mobile terminal interconnected for two-way communications with said mobile communications network, and including registration receiver means for receiving a signal transmitted from said registration means, and selection means for a user to select from at least one of said plurality of fixed terminals and said mobile terminal; and a service node interconnected with said mobile communications network, said service node including means for routing said call to a selected one of said at least one of a plurality of fixed telephone terminals and said mobile terminal, in response to a selection signal received from said mobile telephone.

34. The system according to claim 33, wherein said mobile terminal includes a signal transmitting means for transmitting signals to said registration means, and said registration means further includes a signal receiving means for receiving signals from said mobile terminal.

35. The system according to claim 34, wherein said registration means and said mobile terminal communicate using said means for transmitting signals to said registration means and said signal receiving means for receiving signals from said mobile terminal, whereby a communication includes at least one control signal and user data.

36. The system according to claim 33, wherein said mobile terminal includes a service control module means for receiving registration information from said registration means and means for displaying information.

37. The system according to claim 36, wherein said registration means is integrated with said mobile terminal.

38. The system according to claim 36, wherein said service control module means comprises a separate unit from said mobile terminal and a wired connection is included therebetween.

39. The system according to claim 33, wherein said signal transmitter comprises an infrared transmitter.

40. The system according to claim 33, wherein said signal transmitter comprises a low energy radio transmitter.

41. The system according to claim 33, wherein said service node comprises a PBX network for routing said call to a fixed terminal.

42. The system according to claim 33, wherein said registration means further includes means for detecting a connection between said registration means and a main power line.

43. The system according to claim 33, wherein said registration means further includes means for detecting a connection between said registration means and a fixed telephone line.

44. The system according to claim 33, wherein said registration means further includes a connector, said connector connected between said registration means and a plug in a locked position.

45. The system according to claim 44, wherein said connector includes a switch means for opening and closing an electrical circuit such that an operation of said switch means is indicated in said registration means.

46. The system according to claim 45, wherein said switch means is operated in response to said connector being connected to said plug and shielded from an external operation.

47. The system according to claim 45, wherein said switch means comprises a microswitch.

48. A method for routing an incoming call by remote control effectuated in real time within a mobile communications network, comprising the steps of:

receiving a first signal at a mobile terminal in a mobile communications network, said first signal including a registration identifier associated with a registration device;

receiving a second signal at said mobile terminal from said mobile communications network, said second signal alerting said mobile terminal of said incoming call;

transmitting a third signal from said mobile terminal to said mobile communications network, said third signal including said registration identifier;

receiving a fourth signal at said mobile terminal from said mobile communications network, said fourth signal including at least one fixed terminal identifier associated with at least one fixed terminal;

transmitting a fifth signal from said mobile terminal to said mobile communications network, said fifth signal including a selection of one of said at least one fixed terminal identifier associated with said at least one fixed terminal and an identifier associated with said mobile terminal; and routing said incoming call to one of said at least one fixed terminal and said mobile terminal based on said selection.

49. The method according to claim 48, further comprising the step of displaying on a display at said mobile terminal a list of said at least one fixed terminal associated with said registration device.

50. The method according to claim 49, further comprising the step of transmitting said third and fifth signals to and receiving said second and fourth signals from a service node accessible to said mobile communications network.

51. A method for remote control of rerouting an ongoing call in a mobile communications network, comprising the steps of:

receiving a first signal at a mobile terminal in said mobile communications network, said first signal including a registration identifier associated with a registration device;

transmitting a second signal from said mobile terminal to said mobile communications network, said second signal including said registration identifier;

receiving a third signal at said mobile terminal from said mobile communications network, said third signal including at least one fixed terminal identifier associated with at least one fixed terminal;

transmitting a fourth signal from said mobile terminal to said mobile communications network, said fourth signal including a selected one of said at least one fixed terminal identifier and an identifier of said mobile terminal;

transmitting an alert signal to one of said at least one fixed terminal, based on said selection; and in response to said alert signal being answered, rerouting said ongoing call to said one of at least one fixed terminal.

52. The method according to claim 51, further comprising the step of transmitting said second and fourth signals to and receiving said third and alert signals from a service node accessible to said mobile communications network.

53. The method according to claim 51, further comprising the step of displaying on a display at said mobile terminal a list of said at least one fixed terminals associated with said registration device.

54. A method for remote control of originating a call in a communications network, comprising the steps of:

receiving at a mobile terminal in a mobile communications network a first signal including a registration identifier associated with a registration device;

transmitting a second signal from said mobile terminal to said mobile communications network, said second signal including said registration identifier;

receiving a third signal at said mobile terminal, said third signal including at least one fixed terminal identifier associated with at least one fixed terminal;

transmitting a fourth signal from said mobile terminal to said mobile communications network, said fourth signal including a selected one of said at least one fixed terminal identifier;

receiving, in response to said selection, an alert signal at one of the at least one fixed terminal associated with said selected one of said at least one fixed terminal identifier, whereby a user replying to said alert signal can be connected to a called party.

55. The method according to claim 54, further comprising the step of transmitting said second and fourth signals to and receiving said third and alert signals from a service node accessible to said mobile communications network.

* * * * *

UNITED STATES PATENT AND TRADEMARK OFFICE
CERTIFICATE OF CORRECTION

PATENT NO. :    5,903,833
DATED      :    May 11, 1999
INVENTOR(S) :   Jonsson et al.

It is certified that error appears in the above-identified patent and that said Letters Patent is hereby corrected as shown below:

Column 17, line 65         After "including"
                               Insert --a selection of at least one of--

Column 17, lines 66-67     After "terminal"
                               Insert --and an identifier of said mobile station--

Column 18, line 2          After "from"
                               Insert --one of--

Column 18, line 2          After "terminal"
                               Insert --and said mobile terminal--

Signed and Sealed this

Fourth Day of January, 2000

Attest:

Attesting Officer    Acting Commissioner of Patents and Trademarks